(12) United States Patent
Mizuno et al.

(10) Patent No.: US 11,569,516 B2
(45) Date of Patent: Jan. 31, 2023

(54) FUEL CELL SYSTEM

(71) Applicant: TOYOTA JIDOSHA KABUSHIKI KAISHA, Toyota (JP)

(72) Inventors: Nobukazu Mizuno, Nagakute (JP); Shigeki Hasegawa, Toyota (JP); Miyu Haga, Susuno (JP); Seiichi Tanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/538,004

(22) Filed: Nov. 30, 2021

(65) Prior Publication Data
US 2022/0246965 A1 Aug. 4, 2022

(30) Foreign Application Priority Data

Feb. 3, 2021 (JP) .............................. JP2021-015809

(51) Int. Cl.
*H01M 8/04746* (2016.01)
*H01M 8/0438* (2016.01)

(52) U.S. Cl.
CPC ..... *H01M 8/04761* (2013.01); *H01M 8/0438* (2013.01); *H01M 2250/20* (2013.01)

(58) Field of Classification Search
CPC ........... H01M 8/04761; H01M 8/0438; H01M 2250/20
See application file for complete search history.

(56) References Cited

U.S. PATENT DOCUMENTS

| 2010/0323252 | A1 | 12/2010 | Kobayashi | |
| 2014/0322623 | A1* | 10/2014 | Ohgami | H01M 8/04753 429/427 |
| 2019/0074526 | A1* | 3/2019 | Chikugo | H01M 8/04179 |
| 2021/0135261 | A1* | 5/2021 | Ikeda | H01M 8/04067 |

FOREIGN PATENT DOCUMENTS

| JP | 2009283171 A | 12/2009 |
| JP | 2019067708 A | 4/2019 |

* cited by examiner

*Primary Examiner* — Stewart A Fraser
(74) *Attorney, Agent, or Firm* — Dickinson Wright, PLLC

(57) ABSTRACT

A fuel cell system includes a fuel cell stack, a fuel gas supply path, an injector, an ejector, a circulation path, an outlet port pressure detection unit, and a control device. The control device stops driving the injector when an ejector outlet port pressure is equal to or more than a required upper limit value with the injector driven, and drives the injector when the ejector outlet port pressure is equal to or less than a required lower limit value with the injector stopped. The control device reduces the required upper limit value stepwise and reduces the required lower limit value stepwise in a range defined by a first target upper limit value and a second target upper limit value when a required load is varied from a first required load to a second required load and a load reduction amount is more than a first predetermined load.

2 Claims, 5 Drawing Sheets

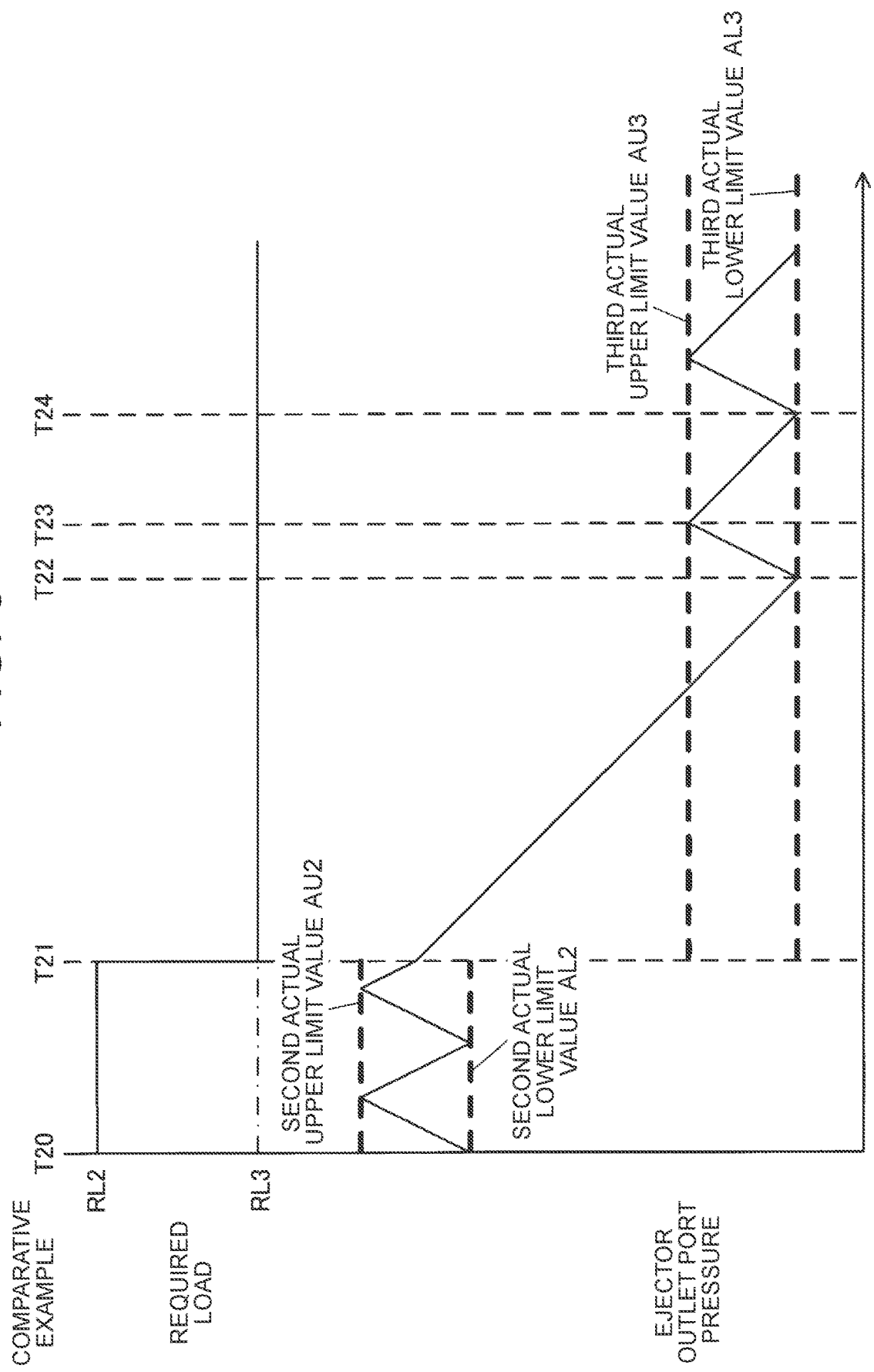

FUEL CELL SYSTEM

CROSS-REFERENCE TO RELATED APPLICATION

This application claims priority to Japanese Patent Application No. 2021-015809 filed on Feb. 3, 2021, incorporated herein by reference in its entirety.

BACKGROUND

1. Technical Field

The technology disclosed herein relates to a fuel cell system.

2. Description of Related Art

Japanese Unexamined Patent Application Publication No. 2019-67708 (JP 2019-67708 A) discloses a fuel cell system that includes a fuel cell stack, a fuel gas supply path through which a fuel gas is supplied to the fuel cell stack, an injector provided in the fuel gas supply path, an ejector provided in the fuel gas supply path and provided between the injector and the fuel cell stack, a circulation path through which a fuel off gas discharged from the fuel cell stack is supplied to the ejector, an outlet port pressure detection unit that detects an outlet port pressure that is the pressure at an outlet port of the ejector, and a control device.

SUMMARY

In general, the pressure at the outlet port of the ejector (hereinafter occasionally referred to as an "ejector outlet port pressure") becomes higher in a state in which the injector is driven (hereinafter referred to as a "driven state"), and the ejector outlet port pressure becomes lower in a state in which drive of the injector is stopped (hereinafter occasionally referred to as a "stopped state"). There exists a fuel cell system in which a required upper limit value and a required lower limit value for the ejector outlet port pressure are specified based on a required load (required electric power) for the fuel cell system. In such a fuel cell system, a control device of the fuel cell system stops driving the injector when the ejector outlet port pressure is equal to or more than the required upper limit value with the injector in the driven state, and starts driving the injector when the ejector outlet port pressure is equal to or less than the required lower limit value with the injector in the stopped state.

The required load for the fuel cell system is occasionally varied from a high load to a low load. A required upper limit value and a required lower limit value corresponding to a high load are larger than a required upper limit value and a required lower limit value corresponding to a low load. In particular, a required lower limit value corresponding to a high load is larger than a required upper limit value corresponding to a low load. Therefore, the ejector outlet port pressure at the time when the required load is varied from a high load to a low load is more than a required upper limit value corresponding to a low load. Thus, driving the injector is stopped if the injector is driven when the required load is varied from a high load to a low load, and the injector is maintained in the stopped state if driving the injector is stopped when the required load is varied from a high load to a low load. Then, the injector is maintained in the stopped state until the ejector outlet port pressure becomes equal to or less than a required lower limit value corresponding to a low load. When there is a large difference between a high load and a low load, the time for which the injector is maintained in the stopped state (hereinafter occasionally referred to as an "injector stopped time") after the required load is varied from a high load to a low load is long. The ejector suctions a fuel off gas that flows through the circulation path using a flow of a fuel gas supplied from the injector with the injector in the driven state, mixes these gases, and supplies the resulting gas to the fuel cell stack. When the injector is in the stopped state, on the other hand, the ejector does not suction a fuel off gas. That is, a fuel off gas is not supplied to the fuel cell stack when the injector is in the stopped state. When the injector stopped time is long, there may be a shortage of hydrogen that can be used for power generation by the fuel cell stack, since a fuel off gas is not supplied to the fuel cell stack. When there is a shortage of hydrogen that can be used for power generation, the fuel cell stack may be degraded.

The present disclosure provides a fuel cell system that includes an ejector and that can suppress degradation of a fuel cell stack.

An aspect of the present disclosure provides a fuel cell system including: a fuel cell stack; a fuel gas supply path configured such that a fuel gas is supplied to the fuel cell stack through the fuel gas supply path; an injector provided in the fuel gas supply path; an ejector provided in the fuel gas supply path and provided between the injector and the fuel cell stack; a circulation path configured such that a fuel off gas discharged from the fuel cell stack is supplied to the ejector through the circulation path; an outlet port pressure detection unit configured to detect an ejector outlet port pressure that is a pressure at an outlet port of the ejector; and a control device, in which the control device is configured to specify a required upper limit value and a required lower limit value corresponding to the ejector outlet port pressure based on a required load for the fuel cell system, stop driving the injector when the ejector outlet port pressure is equal to or more than the required upper limit value with the injector in a driven state, and start driving the injector when the ejector outlet port pressure is equal to or less than the required lower limit value with the injector in a stopped state, and the control device is configured to change the required upper limit value from a first target upper limit value corresponding to a first required load to a second target upper limit value corresponding to a second required load that is lower than the first required load and change the required lower limit value from a first target lower limit value corresponding to the first required load to a second target lower limit value corresponding to the second required load when the required load is varied from the first required load to the second required load and a load reduction amount that is obtained by subtracting the second required load from the first required load is less than a first predetermined load, and reduce the required upper limit value stepwise in a range defined by the first target upper limit value and the second target upper limit value and reduce the required lower limit value stepwise in a range defined by the first target lower limit value and the second target lower limit value when the required load is varied from the first required load to the second required load and the load reduction amount is more than the first predetermined load.

In the configuration described above, the control device reduces the required upper limit value stepwise in a range defined by the first target upper limit value and the second target upper limit value, and reduces the required lower limit value stepwise in a range defined by the first target lower limit value and the second target lower limit value, when the load reduction amount of the required load is more than the first predetermined load. In such a configuration, the ejector outlet port pressure after the required load is varied from the first required load to the second required load becomes equal to or less than the required lower limit value that is reduced stepwise, before becoming equal to or less than the second target lower limit value. The control device starts driving the injector when the ejector outlet port pressure becomes equal to or less than the required lower limit value that is reduced stepwise. Then, the control device stops driving the injector when the ejector outlet port pressure becomes equal to or more than the required upper limit value that is reduced stepwise. In this manner, the injector is driven in the course of the ejector outlet port pressure after the required load is varied from the first required load to the second required load becoming equal to or less than the second target lower limit value. That is, a fuel off gas is supplied to the fuel cell stack via the ejector. Thus, it is possible to suppress a shortage of hydrogen that can be used for power generation by the fuel cell stack. As a result, degradation of the fuel cell stack can be suppressed.

The control device may be configured to reduce the required upper limit value and the required lower limit value stepwise in a range defined by a third target upper limit value corresponding to a third required load and a third target lower limit value corresponding to the third required load when the required load is the third required load, the required upper limit value is the third target upper limit value, the third required load is less than a second predetermined load, and the ejector outlet port pressure is equal to or more than the third target upper limit value with the injector in the driven state.

The amount of reduction per time in the ejector outlet port pressure with the injector in the stopped state is smaller as the required load is lower. Therefore, the time taken for the ejector outlet port pressure to reach the required lower limit value from the required upper limit value is longer as the required load is lower. Also in this case, there may be a shortage of hydrogen that can be used for power generation by the fuel cell stack. In the configuration described above, the control device reduces the required upper limit value and the required lower limit value stepwise when the third required load is less than the second predetermined load. In such a configuration, the ejector outlet port pressure becomes equal to or less than the required lower limit value that is reduced stepwise, before becoming equal to or less than the third target lower limit value. The control device starts driving the injector when the ejector outlet port pressure becomes equal to or less than the required lower limit value that is reduced stepwise in a range defined by the third target lower limit value and the third target lower limit value. Then, the control device stops driving the injector when the ejector outlet port pressure is more than the required upper limit value that is reduced stepwise. In this manner, the injector is driven in the course of the required load becoming equal to or less than the third target lower limit value. That is, a fuel off gas is supplied to the fuel cell stack via the ejector. Thus, it is possible to suppress a shortage of hydrogen that can be used for power generation by the fuel cell stack. As a result, degradation of the fuel cell stack can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a time chart illustrating transitions in a required upper limit value and a required lower limit value according to a comparative example.

DETAILED DESCRIPTION OF EMBODIMENTS

Figure 1:
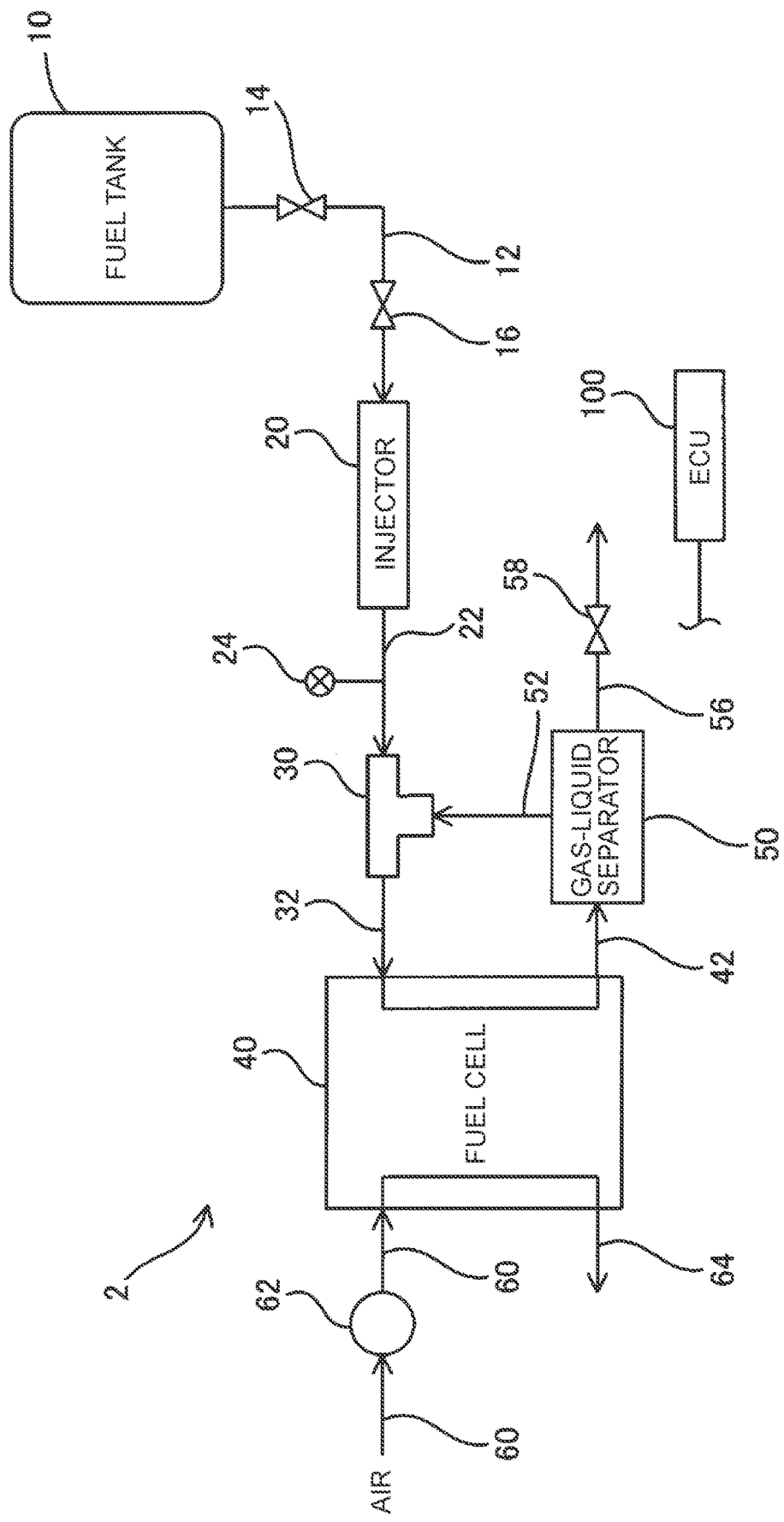
FIG. 1 is a schematic diagram of a fuel cell system according to an embodiment.

A fuel cell system 2 will be described with reference to FIG. 1. The fuel cell system 2 includes a fuel tank 10, an injector 20, an ejector 30, a fuel cell stack 40, a gas-liquid separator 50, and an electronic control unit (ECU) 100 that serves as a control device. The fuel cell system 2 is mounted on a fuel cell vehicle, for example.

The fuel cell stack 40 is a device that generates electric power through a chemical reaction between hydrogen and oxygen. Water is generated through the chemical reaction between hydrogen and water. The fuel cell stack 40 includes a plurality of unit cells (not illustrated). Each of the unit cells includes a fuel electrode and an air electrode. A fuel gas (hydrogen gas) is supplied to the fuel electrode and air containing oxygen is supplied to the air electrode to generate electricity. The electric power generated by the fuel cell stack 40 is supplied to a travel motor of the fuel cell vehicle, for example. An unreacted fuel gas (hereinafter referred to as a "fuel off gas") that was not used in the power generation by the fuel cell stack 40 is discharged from the fuel cell stack 40. The fuel off gas contains water generated during the power generation in the form of vapor.

The fuel tank 10 stores a fuel gas (a hydrogen gas in the present embodiment) to be supplied to the fuel cell stack 40. The upstream end portion of a first fuel supply path 12 is connected to the fuel tank 10. The downstream end portion of the first fuel supply path 12 is connected to the injector 20. The first fuel supply path 12 is provided with a main check valve 14 and a pressure reduction valve 16 arranged in this order from the upstream side to the downstream side. The main check valve 14 opens and closes the first fuel supply path 12. When the main check valve 14 is opened, a fuel gas is supplied from the fuel tank 10 to the fuel cell stack 40. When the main check valve 14 is closed, a fuel gas is not supplied from the fuel tank 10 to the fuel cell stack 40. The pressure reduction valve 16 regulates the pressure of a fuel gas that flows through the first fuel supply path 12. The pressure reduction valve 16 can reduce the pressure of a fuel gas to be supplied to the fuel cell stack 40 through the first fuel supply path 12.

The injector 20 regulates the pressure and the flow rate of a fuel gas to be supplied to the fuel cell stack 40. The injector 20 is an electromagnetic valve, for example. Hydrogen is supplied to the fuel cell stack 40 when the injector 20 is opened, and hydrogen is not supplied to the fuel cell stack 40 when the injector 20 is closed. The pressure and the flow rate of the fuel gas are regulated by regulating the degree of opening and the valve opening time of the injector 20. The upstream end portion of a second fuel supply path 22 is connected to the injector 20. The downstream end portion of the second fuel supply path 22 is connected to the ejector 30. The second fuel supply path 22 is provided with a pressure sensor 24 that detects the pressure of a fuel gas in the second fuel supply path 22.

The upstream end portion of a third fuel supply path 32 is connected to the ejector 30. The downstream end portion of the third fuel supply path 32 is connected to the fuel cell stack 40. The downstream end portion of a gas circulation path 52 is also connected to the ejector 30. As discussed later, a fuel off gas is supplied to the gas circulation path 52. The ejector 30 suctions a fuel off gas that flows through the gas circulation path 52 using a flow of a fuel gas supplied from the second fuel supply path 22, mixes these gases, and dispenses the resulting gas to the third fuel supply path 32. Then, the gas dispensed to the third fuel supply path 32 is supplied to the fuel cell stack 40. Hereinafter, the first fuel supply path 12, the second fuel supply path 22, and the third fuel supply path 32 are occasionally referred to collectively as a "fuel supply path".

The downstream end portion of an air supply path 60 is connected to the fuel cell stack 40. The upstream end portion of the air supply path 60 is open to the outside. The air supply path 60 is provided with a compressor 62. The compressor 62 pumps air introduced into the air supply path 60 to the fuel cell stack 40. For example, air outside the fuel cell vehicle is supplied to the fuel cell stack 40 through the air supply path 60.

The upstream end portion of an exhaust gas path 42 is also connected to the fuel cell stack 40. The downstream end portion of the exhaust gas path 42 is connected to the gas-liquid separator 50. The fuel off gas is supplied to the gas-liquid separator 50 through the exhaust gas path 42. The upstream end portion of an air discharge path 64 is also connected to the fuel cell stack 40. The upstream end portion of the air discharge path 64 is open to the outside. Air that was not used in the power generation by the fuel cell stack 40 is discharged to the outside through the air discharge path 64.

The gas-liquid separator 50 separates water contained in the fuel off gas introduced into the gas-liquid separator 50 from the exhaust gas path 42, and stores the water. Water vapor contained in the fuel off gas introduced into the gas-liquid separator 50 is cooled, and condensed water (liquid water) is stored in the gas-liquid separator 50. For example, water vapor is cooled by outside air, and condensed water (liquid water) is stored in the gas-liquid separator 50.

The upstream end portion of the gas circulation path 52 is connected to the gas-liquid separator 50. A fuel off gas in the gas-liquid separator 50 is supplied to the ejector 30 through the gas circulation path 52. The fuel off gas introduced into the ejector 30 is supplied to the fuel cell stack 40 again through the third fuel supply path 32. Consequently, the fuel off gas discharged from the fuel cell stack 40 is supplied to the fuel cell stack 40 again to be used for power generation.

The upstream end portion of an exhaust/drainage path 56 is also connected to the gas-liquid separator 50. The downstream end portion of the exhaust/drainage path 56 is open to the outside. The exhaust/drainage path 56 is provided with an exhaust/drainage valve 58. When the exhaust/drainage valve 58 is opened, the fuel off gas and the liquid water flow to the outside. When the exhaust/drainage valve 58 is closed, the fuel off gas and the liquid water do not flow to the outside.

The ECU 100 includes a central processing unit (CPU) and a memory such as a read-only memory (ROM) and a random access memory (RAM). The ECU 100 specifies a load (required load) required for the fuel cell system 2, and controls operation of the injector 20 etc. such that a required current can be obtained.

Figure 2:
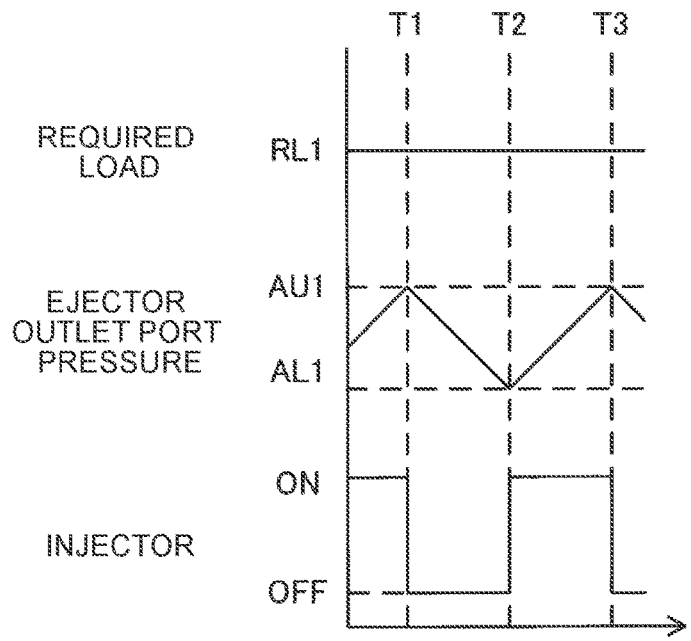
FIG. 2 is a time chart illustrating an example of operation of an injector according to the present embodiment.

Operation of the injector 20 that is controlled by the ECU 100 will be described with reference to FIG. 2. FIG. 2 is a time chart for a case where a required load RL1 is constant and the required load RL1 is a high load. The ECU 100 is configured to control operation of the injector 20 based on the pressure at the outlet port of the ejector 30 (hereinafter occasionally referred to as an "ejector outlet port pressure"). Specifically, the ECU 100 controls operation of the injector 20 such that the ejector outlet port pressure falls within the range between a required upper limit value and a required lower limit value. The ECU 100 is configured to be able to calculate the pressure at the outlet port of the ejector 30 based on the pressure of the fuel gas detected by the pressure sensor 24, the required load, the actual electric power generated by the fuel cell stack 40, etc.

The ECU 100 specifies the present required load RL1, and specifies a first actual upper limit value AU1 and a first actual lower limit value AL1 corresponding to the required load RL1 using the required load RL1. Then, the ECU 100 specifies the first actual upper limit value AU1 as the required upper limit value, and specifies the first actual lower limit value AL1 as the required lower limit value. In this case, the ECU 100 stops driving the injector 20 when the ejector outlet port pressure is equal to or more than the required upper limit value (i.e. the first actual upper limit value AU1) (time T1) in a state in which the injector 20 is driven (hereinafter occasionally referred to as a "driven state"). Next, the ECU 100 starts driving the injector 20 when the ejector outlet port pressure is equal to or less than the required lower limit value (i.e. the first actual lower limit value AL1) (time T2) in a state in which the injector 20 is stopped (hereinafter occasionally referred to as a "stopped state"). Next, the ECU 100 stops driving the injector 20 when the ejector outlet port pressure is equal to or more than the required upper limit value with the injector 20 in the driven state (time T3). In the present embodiment, the different between the actual upper limit value and the actual lower limit value is uniform regardless of the magnitude of the required load.

Upper/lower Limit Value Specifying Processes

A first upper/lower limit value specifying process and a second upper/lower limit value specifying process that are used to specify the required upper limit value and the required lower limit value discussed above will be described with reference to FIGS. 3 and 4.

First Upper/lower Limit Value Specifying Process

The first upper/lower limit value specifying process that is executed by the ECU 100 will be described with reference to FIG. 3. The ECU 100 executes the process in FIG. 3 when fluctuations in the required load are equal to or less than a certain amount, that is, when the required load is stable.

In step S10, the ECU 100 determines whether the present required load is equal to or more than a first load threshold. The first load threshold is a value with which the time required for a change from the actual upper limit value corresponding to the present required load to the actual lower limit value corresponding to the present required load with the injector 20 in the stopped state is equal to or more than the first predetermined time. The first predetermined time is the time over which hydrogen that can be used for power generation by the fuel cell stack 40 becomes short. When the present required load is equal to or more than the first load threshold, the ECU 100 determines YES in step S10, and proceeds to step S12. When the present required load is less than the first load threshold, on the other hand, the ECU 100 determines NO in step S10, and proceeds to step S14.

In step S12, the ECU 100 specifies the actual upper limit value and the actual lower limit value corresponding to the present required load. In this case, the ECU 100 specifies the actual upper limit value as the required upper limit value, and specifies the actual lower limit value as the required lower limit value, to control operation of the injector 20. When the process in step S12 is finished, the ECU 100 returns to step S10.

In step S14, the ECU 100 specifies the actual upper limit value and the actual lower limit value corresponding to the present required load. The ECU 100 further specifies N (an integer of 1 or more) virtual upper limit values and N virtual lower limit values using the actual upper limit value and the actual lower limit value. In the present embodiment, N is "2". The two virtual upper limit values and the two virtual lower limit values are larger than the actual upper limit value and smaller than the actual lower limit value. The ECU 100 controls operation of the injector 20 while reducing the required upper limit value and the required lower limit value stepwise using the actual upper limit value, the two virtual upper limit values, the actual lower limit value, and the two virtual lower limit values. The method of reducing the required upper limit value and the required lower limit value stepwise will be described in detail later (see FIG. 5). When the process in step S14 is finished, the ECU 100 returns to step S10. In modifications, N may be "1", or may be an integer of "3" or more.

Second Upper/lower Limit Value Specifying Process

The second upper/lower limit value specifying process that is executed by the ECU 100 will be described with reference to FIG. 4. The ECU 100 executes the process in FIG. 4 when the amount of variations in the required load is larger than the certain amount.

In step S30, the ECU 100 determines whether the required load has been reduced. The ECU 100 determines whether the required load has been reduced based on whether the present required load is higher than a required load in the past (e.g. 1 second earlier). When the required load has been increased, the ECU 100 determines NO in step S30, and proceeds to step S32. When the required load has been reduced, on the other hand, the ECU 100 determines YES in step S30, and proceeds to step S40. The content of the process executed in step S32 is the same as the content of the process executed in step S12 in FIG. 3. When the process in step S32 is finished, the ECU 100 ends the process in FIG. 4.

In step S40, the ECU 100 determines whether the amount of reduction in the required load (hereinafter referred to as a "load reduction amount") is equal to or more than a second load threshold. The ECU 100 calculates the load reduction amount by subtracting the present required load from a required load in the past (e.g. 1 second earlier). Then, when the load reduction amount is equal to or more than the second load threshold, the ECU 100 determines YES in step S40, and proceeds to step S42. When the load reduction amount is less than the second load threshold, on the other hand, the ECU 100 determines NO in step S40, and proceeds to step S32.

In step S42, the ECU 100 specifies the actual upper limit value and the actual lower limit value corresponding to the required load at present (e.g. after being varied). The ECU 100 further specifies M (an integer of 1 or more) virtual upper limit values using the actual upper limit value corresponding to the required load in the past (e.g. 1 second earlier) and the actual upper limit value corresponding to the present required load. The ECU 100 also specifies M virtual lower limit values using the actual lower limit value in the past and the actual lower limit value at present. In the present embodiment, M is "3". In this case, the ECU 100 controls operation of the injector 20 while reducing the required upper limit value and the required lower limit value stepwise using the actual upper limit value in the past, the three actual upper limit values, the actual upper limit value at present, the actual lower limit value in the past, the three virtual lower limit values, and the actual lower limit value at present. The method of reducing the required upper limit value and the required lower limit value stepwise will be described in detail later (see FIG. 5). When the process in step S42 is finished, the ECU 100 ends the process in FIG. 4. The ECU 100 does not execute the process in FIG. 3 before the pressure at the outlet port of the ejector 30 becomes equal to or less than the actual lower limit value at present, even when the amount of fluctuations in the required load is equal to or less than the certain amount after step S42. In modifications, M may be "1" or "2", or may be an integer of "4" or more.

Specific Case

Subsequently, a specific case implemented by executing the processes in FIGS. 3 and 4 will be described with reference to FIG. 5. In FIG. 5, operation of the injector 20 is omitted for ease of viewing. In FIG. 5, a required load RL2 is more than the first load threshold, and a required load RL3 is less than the first load threshold. In addition, the load reduction amount that is obtained by subtracting the required load RL3 from the required load RL2 is larger than the second load threshold. In FIG. 5, the required upper limit value and the required lower limit value are each indicated by a thick dashed line.

Figure 3:
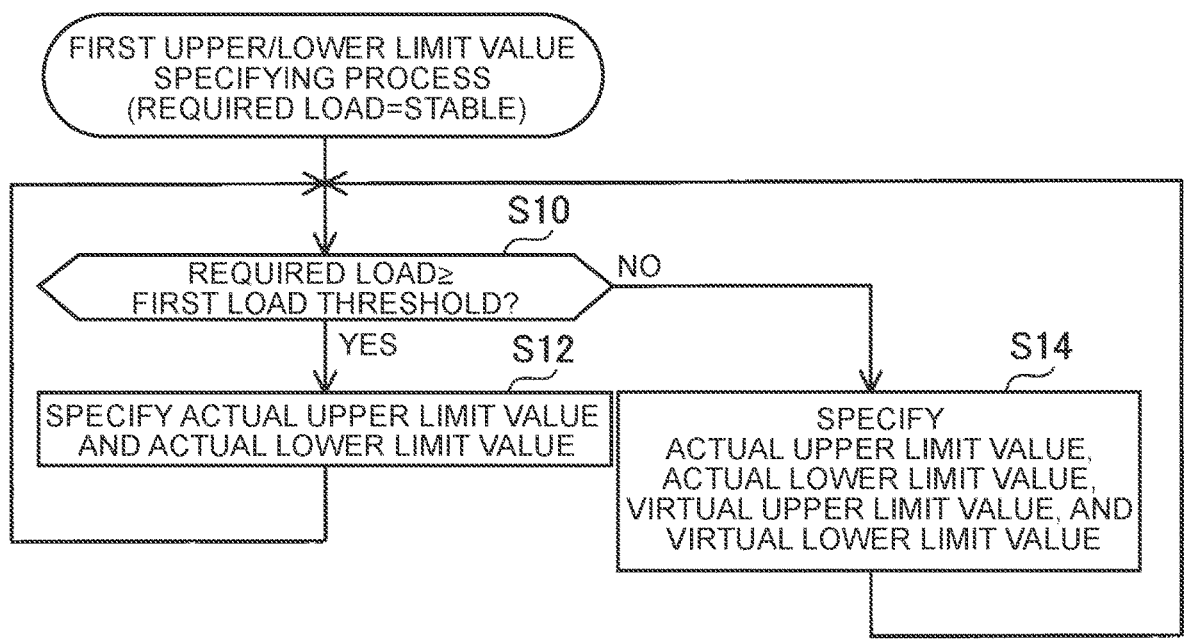
FIG. 3 is a flowchart of a first upper/lower limit value specifying process according to the present embodiment.

At time T10, the ECU 100 determines that the required load is stable, and executes the first upper/lower limit value specifying process (FIG. 3). The ECU 100 determines that the required load RL2 is more than the first load threshold (YES in step S10 in FIG. 3), and specifies a second actual upper limit value AU2 and a second actual lower limit value AL2 corresponding to the required load RL2 (step S12). Then, the ECU 100 specifies the second actual upper limit value AU2 as the required upper limit value, and specifies the second actual lower limit value AL2 as the required lower limit value. In this case, the ECU 100 stops driving the injector 20 when the ejector outlet port pressure is equal to or more than the required upper limit value (i.e. the second actual upper limit value AU2) with the injector 20 in the state of being driven, and starts driving the injector 20 when the ejector outlet port pressure is equal to or less than the required lower limit value (i.e. the second actual lower limit value AL2) with the injector 20 in the state of being stopped.

Figure 4:
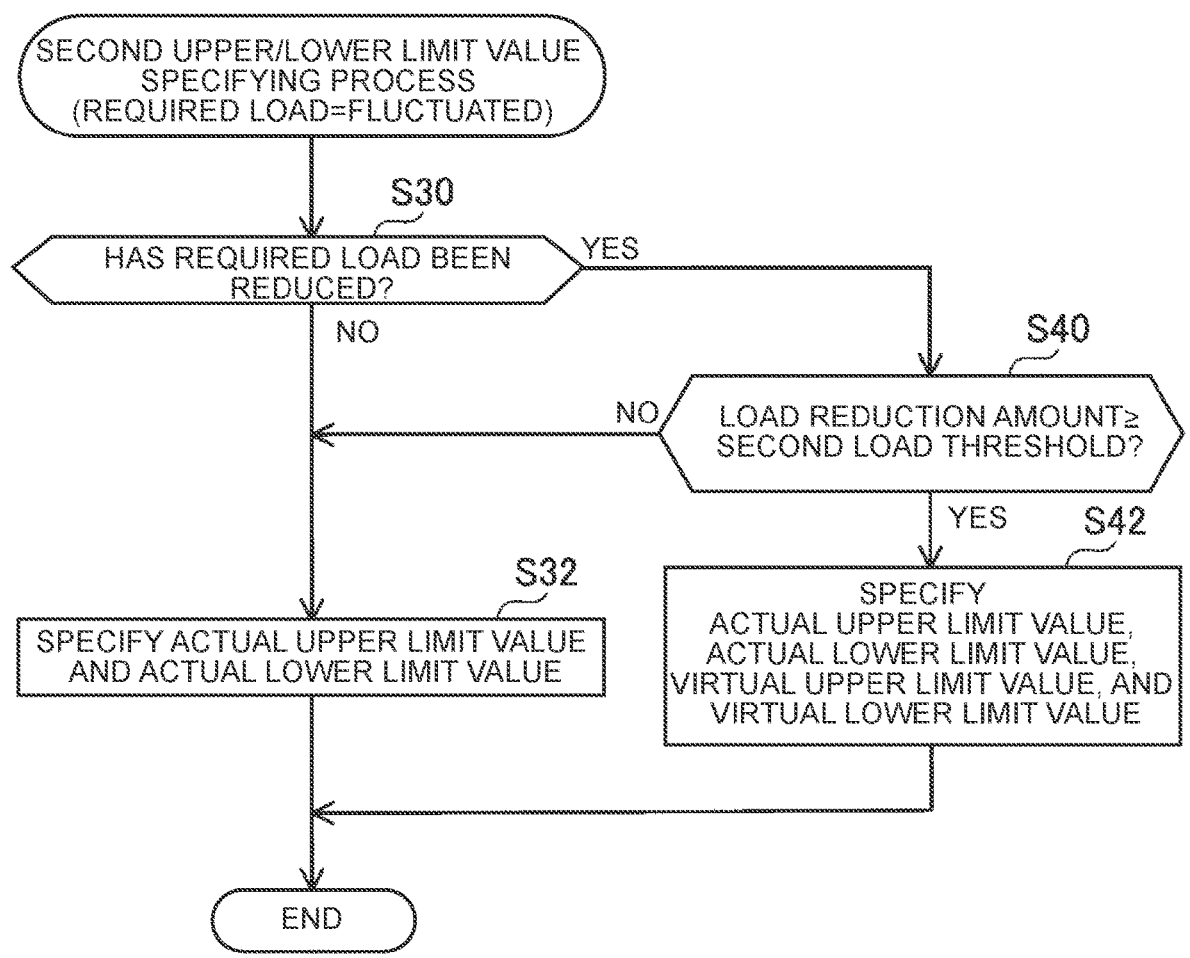
FIG. 4 is a flowchart of a second upper/lower limit value specifying process according to the present embodiment.
Figure 5:
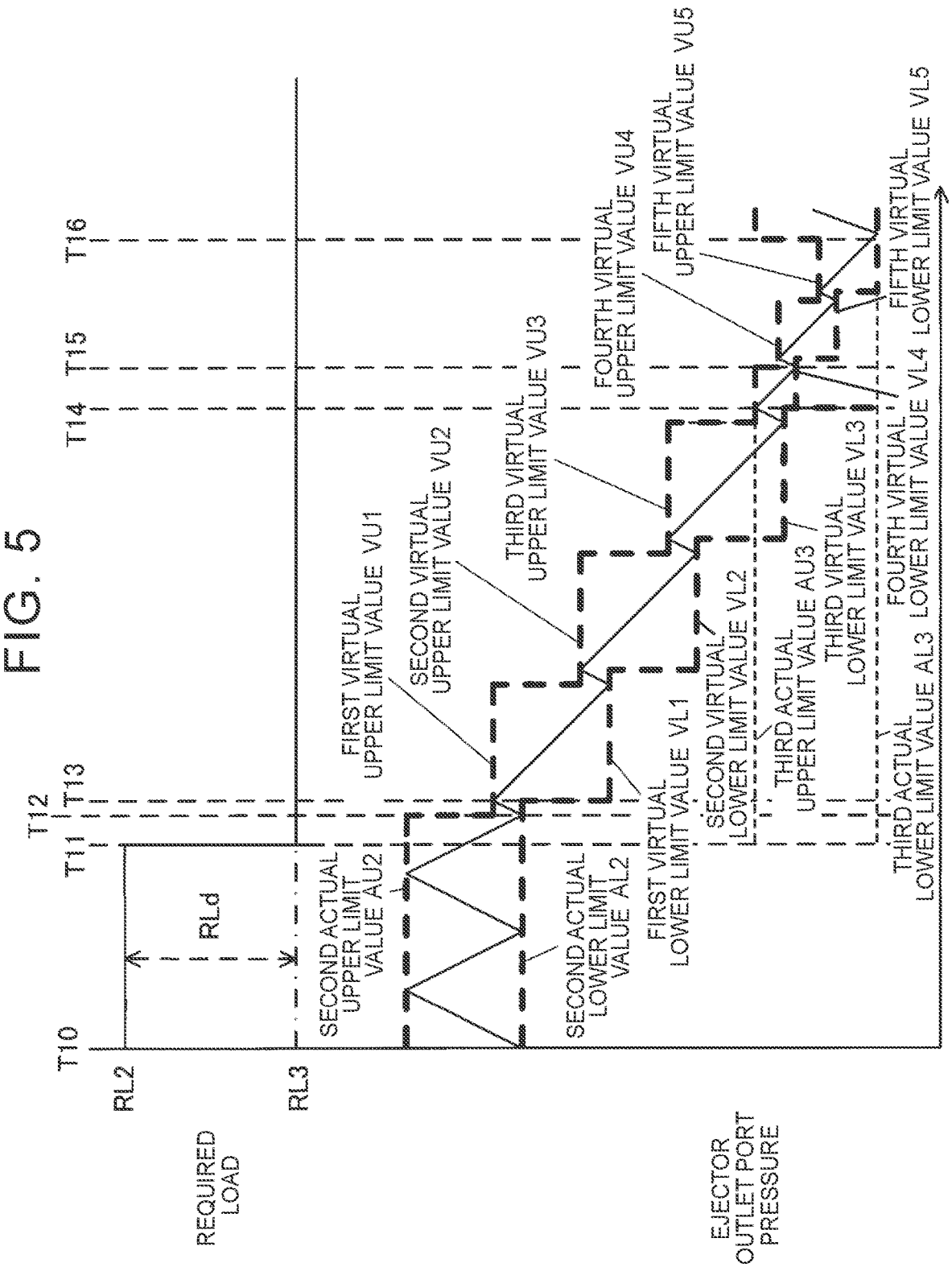
FIG. 5 is a time chart illustrating transitions in a required upper limit value and a required lower limit value according to the present embodiment.

At time T11, the ECU 100 determines that the required load has been varied from the required load RL2 to the required load RL3, and executes the second upper/lower limit value specifying process (FIG. 4). Since the required load RL3 is lower than the required load RL2, the ECU 100 determines that the required load has been reduced (YES in step S30), and determines that a load reduction amount RLd that is obtained by subtracting the required load RL3 from the required load RL2 is more than the second load threshold (YES in step S40). In this case, the ECU 100 specifies a third actual upper limit value AU3 and a third actual lower limit value AL3 corresponding to the required load RL3 (step S42). Then, the ECU 100 calculates first to third virtual upper limit values VU1 to VU3 using the second actual upper limit value AU2 and the third actual upper limit value AU3 (step S42). The ECU 100 calculates the first to third virtual upper limit values VU1 to VU3 such that the difference between the second actual upper limit value AU2 and the first virtual upper limit value VU1, the difference between the first virtual upper limit value VU1 and the second virtual upper limit value VU2, the difference between the second virtual upper limit value VU2 and the third virtual upper limit value VU3, and the difference between the third virtual upper limit value VU3 and the third actual upper limit value AU3 are the same as each other. The ECU 100 also calculates first to third virtual lower limit values VL1 to VL3 using the second actual lower limit value AL2 and the third actual lower limit value AL3. The ECU 100 calculates the first to third virtual lower limit values VL1 to VL3 such that the difference between the second actual lower limit value AL2 and the first virtual lower limit value VL1, the difference between the first virtual lower limit value VL1 and the second virtual lower limit value VL2, the difference between the second virtual lower limit value VL2 and the third virtual lower limit value VL3, and the difference between the third virtual lower limit value VL3 and the third actual lower limit value AL3 are the same as each other. After that, the ECU 100 reduces the required upper limit value and the required lower limit value stepwise using the second actual upper limit value AU2, the first to third virtual upper limit values VU1 to VU3, the third actual upper limit value AU3, the second actual lower limit value AL2, the first to third virtual lower limit values VL1 to VL3, and the third actual lower limit value AL3.

At time T12, the ECU 100 determines that the ejector outlet port pressure is equal to or less than the required lower limit value (i.e. the second actual lower limit value AL2), and changes the required upper limit value from the second actual upper limit value AU2 to the first virtual upper limit value VU1, and starts driving the injector 20. Next, at time T13, the ECU 100 determines that the ejector outlet port pressure is equal to or more than the required upper limit value (i.e. the first virtual upper limit value VU1), and changes the required lower limit value from the second actual lower limit value AL2 to the first virtual lower limit value VL1, and stops driving the injector 20. After that, the ECU 100 changes the required upper limit value in the order of the second virtual upper limit value VU2, the third virtual upper limit value VU3, and the third actual upper limit value AU3 each time the ejector outlet port pressure becomes equal to or less than the required lower limit value. In addition, the ECU 100 changes the required lower limit value in the order of the second virtual lower limit value VL2, the third virtual lower limit value VL3, and the third actual lower limit value AL3 each time the ejector outlet port pressure becomes equal to or more than the required upper limit value. In this manner, the ECU 100 according to the present embodiment reduces the required upper limit value and the required lower limit value stepwise using the first to third virtual upper limit values VU1 to VU3 and the first and third virtual lower limit values VL1 to VL3. The ECU 100 reduces the required upper limit value each time the ejector outlet port pressure becomes equal to or less than the required lower limit value, and reduces the required lower limit value each time the ejector outlet port pressure becomes equal to or more than the required upper limit value. In modifications, the timing to reduce the required upper limit value and the timing to reduce the required lower limit value may be the same as each other.

At time T14, the ECU 100 determines that the amount of variations in the required load is equal to or less than the certain amount and that the ejector outlet port pressure is equal to or less than the third actual lower limit value AL3 corresponding to the present required load RL3, and executes the first upper/lower limit value specifying process (FIG. 3). The ECU 100 determines that the required load RL3 is less than the first load threshold (NO in step S10 in FIG. 3). In this case, the ECU 100 specifies the third actual upper limit value AU3 and the third actual lower limit value AL3 corresponding to the required load RL3 (step S14). Then, the ECU 100 calculates a fourth virtual lower limit value VL4 and a fifth virtual lower limit value VL5 using the third actual upper limit value AU3 and the third actual lower limit value AL3 (step S14). The ECU 100 calculates the fourth virtual lower limit value VL4 and the fifth virtual lower limit value VL5 such that the difference between the third actual upper limit value AU3 and the fourth virtual upper limit value VU4 and the difference between the fifth virtual upper limit value VU5 and the third actual lower limit value AL3 are the same as each other. In addition, the ECU 100 specifies a value that is larger than the fourth virtual lower limit value VL4 by a predetermined value as the fourth virtual upper limit value VU4, and specifies a value that is larger than the fifth virtual lower limit value VL5 by the predetermined value as the fifth virtual upper limit value VU5 (step S14). After that, the ECU 100 reduces the required upper limit value and the required lower limit value stepwise using the third actual upper limit value AU3, the fourth virtual upper limit value VU4, the fifth virtual upper limit value VU5, the third actual lower limit value AL3, the fourth virtual lower limit value VL4, and the fifth virtual lower limit value VL5.

At time T14, the ECU 100 determines that the ejector outlet port pressure is equal to or more than the required upper limit value (i.e. the third actual upper limit value AU3), and changes the required lower limit value from the third actual lower limit value AL3 to the fourth virtual lower limit value VL4, and stops driving the injector 20. Next, at time T15, the ECU 100 determines that the ejector outlet port pressure is equal to or less than the required upper limit value (i.e. the fourth virtual lower limit value VL4), and changes the required upper limit value from the third actual upper limit value AU3 to the fourth virtual upper limit value VU4, and stops driving the injector 20. After that, the ECU 100 changes the required lower limit value in the order of the fifth virtual lower limit value VL5 and the third actual lower limit value AL3 each time the ejector outlet port pressure becomes equal to or more than the required upper limit value. In addition, the ECU 100 changes the required upper limit value to the fifth virtual upper limit value VU5 when the ejector outlet port pressure becomes equal to or less than the required lower limit value (fifth virtual lower limit value VL5). In this manner, the ECU 100 according to the present embodiment reduces the required upper limit value and the required lower limit value stepwise using the fourth virtual upper limit value VU4, the fifth virtual upper limit value VU5, the fourth virtual lower limit value VL4, and the fifth virtual lower limit value VL5. At time T16, the ECU 100 determines that the ejector outlet port pressure is equal to or less than the required lower limit value (i.e. the third actual lower limit value AL3), and changes the required upper limit value to the third actual upper limit value AU3.

Effects of Present Embodiment

Operation of a fuel cell system according to a comparative example will be described with reference to FIG. 6 before describing the effects of the present embodiment. The fuel cell system according to the comparative example is the same as the fuel cell system 2 according to the present embodiment except for not executing the processes in FIGS. 3 and 4. In FIG. 6, the required upper limit value and the required lower limit value are each indicated by a thick dashed line.

Operation of the fuel cell system according to the comparative example from time T20 to time T21 in FIG. 6 is the same as operation of the fuel cell system 2 according to the present embodiment from time T10 to time T11 in FIG. 5.

At time T21, an ECU of the fuel cell system according to the comparative example determines that the required load has been varied, and specifies the third actual upper limit value AU3 and the third actual lower limit value AL3 corresponding to the required load RL3. Then, the ECU according to the comparative example specifies the third actual upper limit value AU3 as the required upper limit value, and specifies the third actual lower limit value AL3 as the required lower limit value. In this case, the ECU according to the comparative example stops driving the injector 20 when the ejector outlet port pressure is equal to or more than the required upper limit value (i.e. the third actual upper limit value AU3) with the injector 20 in the state of being driven, and starts driving the injector 20 when the ejector outlet port pressure is equal to or less than the required lower limit value (i.e. the third actual lower limit value AL3) with the injector 20 in the state of being stopped. The outlet port pressure at time T21 is more than the required upper limit value. Therefore, the injector 20 is maintained in the stopped state.

At time T22, the ECU according to the comparative example determines that the ejector outlet port pressure is equal to or less than the required lower limit value (i.e. the third target lower limit value), and starts driving the injector 20. In this manner, drive of the injector 20 is stopped during a period from time T21 to time T22 in the fuel cell system according to the comparative example. In this case, hydrogen that can be used for power generation by the fuel cell stack 40 may become short, and the fuel cell stack 40 may be degraded.

At time T23, the ECU according to the comparative example determines that the ejector outlet port pressure is equal to or more than the required upper limit value (i.e. the third actual upper limit value AU3), and stops driving the injector 20. At time T24, the ECU according to the comparative example determines that the ejector outlet port pressure is equal to or less than the required lower limit value (i.e. the third actual lower limit value AL3), and starts driving the injector 20. In this manner, drive of the injector 20 is stopped during a period from time T23 to time T24 in the fuel cell system according to the comparative example. In this case, hydrogen that can be used for power generation by the fuel cell stack 40 may become short, and the fuel cell stack 40 may be degraded.

As illustrated in FIG. 5, the ECU 100 reduces the required upper limit value and the required lower limit value stepwise when the load reduction amount of the required load is larger than the second load threshold (YES in step S40 in FIG. 4). In such a configuration, the ejector outlet port pressure after the required load is varied from the required load RL2 to the required load RL3 becomes equal to or less than the required lower limit value that is reduced stepwise, before the ejector outlet port pressure becomes equal to or less than the actual lower limit value (i.e. the third actual lower limit value AL3) corresponding to the required load RL3 after being varied. The ECU 100 starts driving the injector 20 when the ejector outlet port pressure is equal to or less than the required lower limit value that is reduced stepwise. Then, the ECU 100 stops driving the injector 20 when the ejector outlet port pressure is equal to or more than the required upper limit value that is reduced stepwise. In this manner, the injector 20 is driven in the course of the ejector outlet port pressure being brought to the third actual lower limit value AL3 after the required load is varied from the required load RL2 to the required load RL3. That is, the fuel off gas is supplied to the fuel cell stack 40 via the ejector 30. Thus, it is possible to suppress a shortage of hydrogen that can be used for power generation by the fuel cell stack 40. As a result, degradation of the fuel cell stack 40 can be suppressed.

As illustrated in FIG. 5, in addition, the ECU 100 reduces the required upper limit value and the required lower limit value stepwise when the required load RL3 is less than the second load threshold. With such a configuration, the ejector outlet port pressure becomes equal to or less than the required lower limit value that is reduced stepwise, before becoming equal to or less than the third actual lower limit value AL3. The ECU 100 starts driving the injector 20 when the ejector outlet port pressure is equal to or less than the required lower limit value that is reduced stepwise. Then, the ECU 100 stops driving the injector 20 when the ejector outlet port pressure becomes more than the required upper limit value that is reduced stepwise. In this manner, the injector 20 is driven in the course of the required load being brought to the third actual lower limit value AL3. That is, the fuel off gas is supplied to the fuel cell stack 40 via the ejector 30. Thus, it is possible to suppress a shortage of hydrogen that can be used for power generation by the fuel cell stack 40. As a result, degradation of the fuel cell stack 40 can be suppressed.

Correspondence

The required load RL2 and the required load RL3 are each an example of the "first required load" and the "second required load", respectively. The second load threshold and the first load threshold are each an example of the "first predetermined load" and the "second predetermined load", respectively. The second actual upper limit value AU2 and the second actual lower limit value AL2 are each an example of the "first target upper limit value" and the "first target lower limit value", respectively. The third actual upper limit value AU3 and the third actual lower limit value AL3 are each an example of the "second target upper limit value" and the "second target lower limit value", respectively. The required load RL3 is an example of the "third required load". The third actual upper limit value AU3 and the third actual lower limit value AL3 are each an example of the "third target upper limit value" and the "third target lower limit value", respectively.

While a specific embodiment of the present disclosure has been described in detail above, the embodiment is merely an illustration, and does not limit the scope of the claims. The technology described in the claims includes various modifications and variations of the specific embodiment described above.

First Modification

The fuel cell system 2 may include a pressure sensor provided in the gas circulation path 52. In this case, the ECU 100 calculates the ejector outlet port pressure based on the pressure of the fuel gas detected by the pressure sensor 24, the pressure of the fuel off gas detected by the pressure sensor provided in the gas circulation path 52, the required load, the actual electric power generated by the fuel cell stack 40, etc. With such a configuration, it is possible to improve the precision in calculating the outlet port pressure of the ejector 30. In another modification, the fuel cell system 2 may include a pressure sensor provided in the third fuel supply path 32.

Second Modification

The ECU 100 may not execute the first upper/lower limit value specifying process in FIG. 3. In the present modification, the ECU 100 does not vary the required upper limit value or the required lower limit value stepwise when the required load is stable. In the present modification, the ECU 100 may calculate the target upper limit values and the target lower limit values such that the difference between a target upper limit value and a target lower limit value corresponding to a low load is smaller than the difference between a target upper limit value and a target lower limit value corresponding to a high load.

Third Modification

Steps S10 and S12 in FIG. 3 may be omitted. In the present modification, the ECU 100 varies the required upper limit value and the required lower limit value stepwise regardless of the magnitude of the required load.

Fourth Modification

The ECU 100 may gradually decrease the required upper limit value from a target upper limit value in the past to a target upper limit value at present and gradually decrease the required lower limit value from a target lower limit value in the past to a target lower limit value at present when the amount of fluctuations in the required load is larger than the first load threshold. In this case, the amount of reduction per time in the required upper limit value and the required lower limit value may be smaller than the amount of reduction per time in the ejector outlet port pressure with the injector 20 in the stopped state.

Fifth Modification

In the embodiment described above, the amount of reduction in the required upper limit value and the required lower limit value is constant. The amount of reduction in the required upper limit value and the required lower limit value may not be constant. For example, the amount of reduction in the required upper limit value and the required lower limit value may become gradually larger.

The technical elements described herein or illustrated in the drawings exhibit technical usefulness alone or in various combinations, and are not limited to the combinations described in the claims as filed. In addition, the technology described herein or illustrated in the drawings may achieve a plurality of objects at the same time, and has technical usefulness by achieving one of the objects itself.

What is claimed is:

1. A fuel cell system comprising:
    a fuel cell stack;
    a fuel gas supply path configured such that a fuel gas is supplied to the fuel cell stack through the fuel gas supply path;
    an injector provided in the fuel gas supply path;
    an ejector provided in the fuel gas supply path and provided between the injector and the fuel cell stack;
    a circulation path configured such that a fuel off gas discharged from the fuel cell stack is supplied to the ejector through the circulation path;
    an outlet port pressure detection unit configured to detect an outlet port pressure that is a pressure at an outlet port of the ejector; and
    a control device,
    wherein the control device is configured to
    specify a required upper limit value and a required lower limit value corresponding to the outlet port pressure based on a required load for the fuel cell system,
    stop driving the injector when the outlet port pressure is equal to or more than the required upper limit value with the injector in a driven state, and
    start driving the injector when the outlet port pressure is equal to or less than the required lower limit value with the injector in a stopped state, and
    wherein the control device is configured to
    change the required upper limit value from a first target upper limit value corresponding to a first required load to a second target upper limit value corresponding to a second required load that is lower than the first required load and change the required lower limit value from a first target lower limit value corresponding to the first required load to a second target lower limit value corresponding to the second required load when the required load is varied from the first required load to the second required load and a load reduction amount that is obtained by subtracting the second required load from the first required load is less than a first predetermined load, and
    reduce the required upper limit value stepwise in a range defined by the first target upper limit value and the second target upper limit value and reduce the required lower limit value stepwise in a range defined by the first target lower limit value and the second target lower limit value when the required load is varied from the first required load to the second required load and the load reduction amount is more than the first predetermined load.

2. The fuel cell system according to claim 1, wherein the control device is configured to reduce the required upper limit value and the required lower limit value in a range defined by a third target upper limit value corresponding to a third required load and a third target lower limit value corresponding to the third required load when the required load is the third required load, the required upper limit value is the third target upper limit value, the third required load is less than a second predetermined load, and the outlet port pressure is equal to or more than the third target upper limit value with the injector in the driven state.

* * * * *